(12) United States Patent
Gibson et al.

(10) Patent No.: US 11,932,377 B2
(45) Date of Patent: Mar. 19, 2024

(54) ACTUATION MECHANISM FOR CONTROLLING AIRCRAFT SURFACES

(71) Applicant: The Boeing Company, Chicago, IL (US)

(72) Inventors: Noah W. Gibson, Seattle, WA (US); Kevin Tsai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/830,400

(22) Filed: Jun. 2, 2022

(65) Prior Publication Data

US 2022/0388631 A1 Dec. 8, 2022

Related U.S. Application Data

(60) Provisional application No. 63/196,863, filed on Jun. 4, 2021.

(51) Int. Cl.
*B64C 13/30* (2006.01)
*B64C 9/16* (2006.01)

(52) U.S. Cl.
CPC ........... *B64C 13/30* (2013.01); *B64C 9/16* (2013.01)

(58) Field of Classification Search
CPC .. B64C 13/30; B64C 9/00; B64C 9/02; B64C 9/04; B64C 13/24; B63C 13/28
See application file for complete search history.

(56) References Cited

U.S. PATENT DOCUMENTS

| 2012/0091283 A1* | 4/2012 | Uchida | B64C 9/02 244/99.3 |
| 2018/0162516 A1* | 6/2018 | Brown | F16H 49/001 |
| 2019/0241250 A1* | 8/2019 | Hencke | B64C 9/04 |

FOREIGN PATENT DOCUMENTS

CA 2716169 A1 11/2009

* cited by examiner

*Primary Examiner* — Brady W Frazier
*Assistant Examiner* — Shanna Danielle Glover
(74) *Attorney, Agent, or Firm* — Quinn IP Law

(57) ABSTRACT

An actuation mechanism includes a control surface having a hinged end pivotally coupled to a wing structure, a first pivot arm and a second pivot arm coupled to the control surface, a first drive rod coupled to the first pivot arm, and a second drive rod coupled to the second pivot arm. A first bell crank is coupled via a first pivot pin to the wing structure at a first position and to the first drive rod. A second bell crank is coupled via a second pivot pin to the wing structure at a second position spaced apart from the first position and to the second drive rod. A coupling rod extends between the first bell crank and the second bell crank such that a rotation of the first bell crank is synchronized with a rotation of the second bell crank.

14 Claims, 9 Drawing Sheets

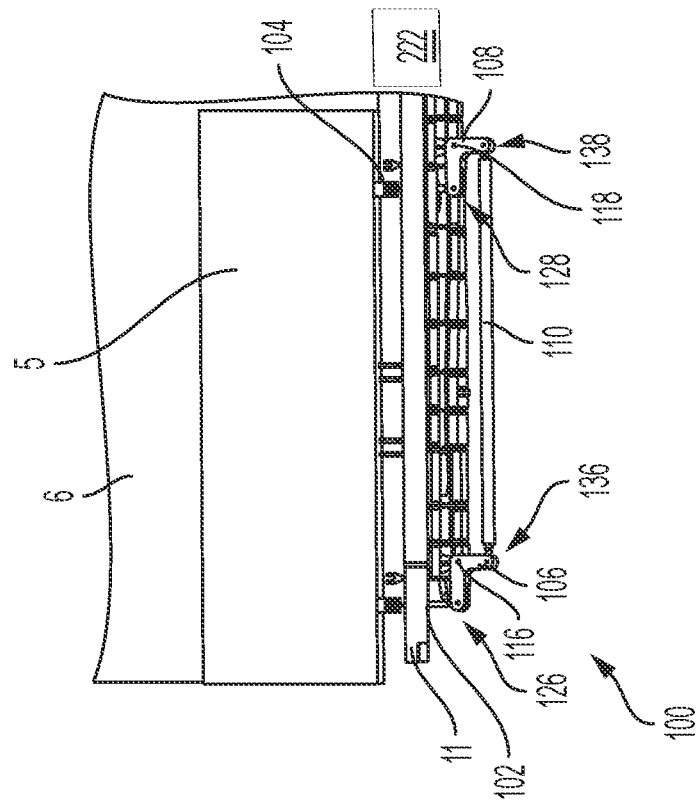
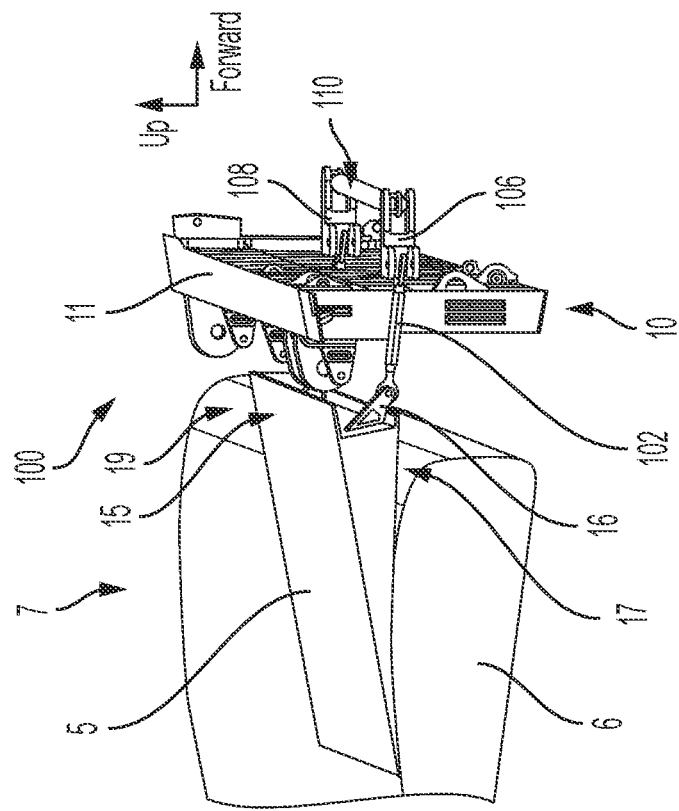

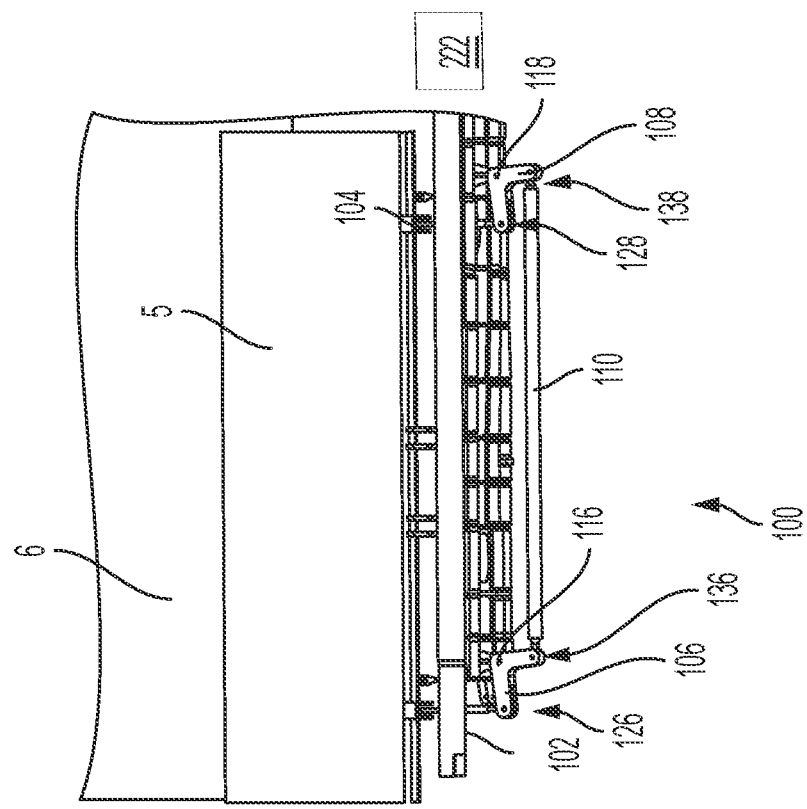
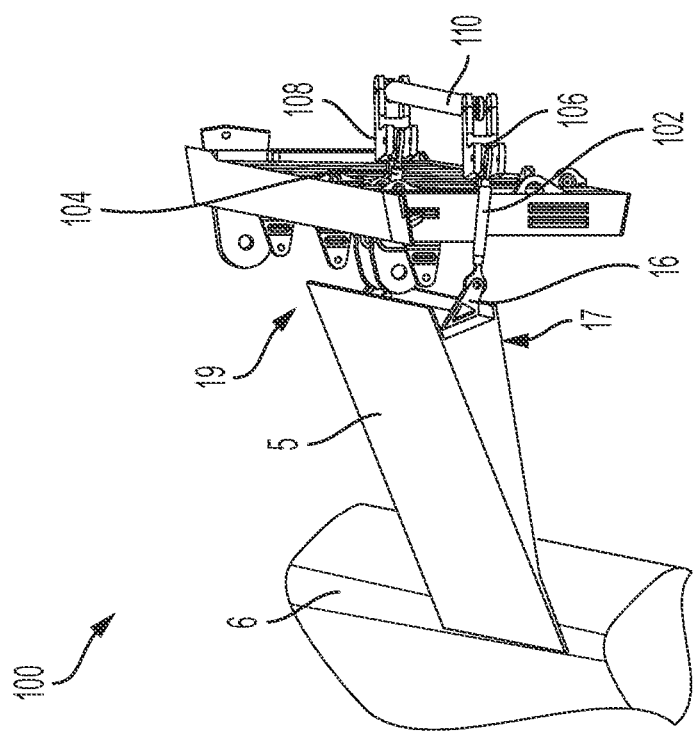
FIG. 4
FIG. 3

ACTUATION MECHANISM FOR CONTROLLING AIRCRAFT SURFACES

CROSS-REFERENCE TO RELATED APPLICATIONS

The present patent application claims priority to, and the benefit of, U.S. Provisional Application 63/196,863 filed Jun. 4, 2021, the disclosure of which is hereby incorporated by reference in its entirety.

INTRODUCTION

The present disclosure relates to the field of aircraft wing systems and actuation mechanisms and apparatus for controlling a moveable surface of an aircraft.

A moveable surface of an aircraft, such as a droop panel, may have its rotation controlled only at one end, such as an inboard end. Rotation control of one end of the moveable surface can result in skew or twist, causing deflection of the moveable surface and reduced performance.

SUMMARY

Embodiments according to the present disclosure provide a number of advantages. For example, embodiments according to the present disclosure include an actuation mechanism that rotates both ends of a moveable surface, such as the inboard and outboard ends, the same amount to prevent skew of the surface. Control of the skew results in performance benefits including reduced deflection and improved seal to improve aerodynamic performance.

In one aspect of the present disclosure, an actuation mechanism includes a control surface having a hinged end pivotally coupled to a wing structure, a first pivot arm and a second pivot arm coupled to the control surface at the hinged end, a first drive rod having a forward end and an aft end, the aft end coupled to the first pivot arm, and a second drive rod having a forward end and an aft end, the aft end coupled to the second pivot arm. The actuation mechanism also includes a first bell crank coupled via a first pivot pin to the wing structure at a first position. The first bell crank has a first end portion coupled to the forward end of the first drive rod and a second end portion. The actuation mechanism further includes a second bell crank coupled via a second pivot pin to the wing structure at a second position spaced apart from the first position. The second bell crank has a first end portion coupled to the forward end of the second drive rod and a second end portion. The actuation mechanism also includes a coupling rod extending between the second end portion of the first bell crank and the second end portion of the second bell crank such that a rotation of the first bell crank is synchronized with a rotation of the second bell crank.

In some aspects, the coupling rod further synchronizes a displacement of the first and second drive rods to inhibit skewing of the control surface when the control surface moves between a first position and a second position.

In some aspects, the coupling rod extends a distance between the first position of the first bell crank and the second position of the second bell crank along at least a portion of a span of the control surface.

In some aspects, the first and second bell cranks and the coupling rod are disposed forward of the wing structure.

In some aspects, the first and second drive rods extend through the wing structure.

In some aspects, the first bell crank includes a first angle between the first end portion and the second end portion, and the second bell crank includes a second angle between the first end portion and the second end portion such that the first and second bell cranks permit synchronized rotation and translation of the control surface.

In some aspects, the first bell crank includes a first angle between the first end portion and the second end portion, and the second bell crank includes a second angle between the first end portion and the second end portion such that the first and second bell cranks permit synchronized rotation and not translation of the control surface.

In some aspects, the first pivot arm includes a first attachment point adjacent to the control surface and a second attachment point spaced apart from the control surface. The first drive rod is coupled to the first pivot arm at the first attachment point. The second pivot arm includes a first attachment point adjacent to the control surface and a second attachment point spaced apart from the control surface. The second drive rod is coupled to the second pivot arm at the first attachment point such that the rotation of the first and second bell cranks drives a synchronous rotation of the control surface.

In some aspects, the first pivot arm includes a first attachment point adjacent to the control surface and a second attachment point spaced apart from the control surface. The first drive rod is coupled to the first pivot arm at the second attachment point. The second pivot arm includes a first attachment point adjacent to the control surface and a second attachment point spaced apart from the control surface. The second drive rod is coupled to the second pivot arm at the second attachment point such that the rotation of the first and second bell cranks drives a synchronous rotation and translation of the control surface.

In some aspects, the actuation mechanism further includes an actuator coupled to an inboard side of the control surface. The actuator is configured to control the rotation of the first and second bell cranks.

In another aspect of the present disclosure, a vehicle includes a wing having a wing structure supporting an upper wing surface and a lower wing surface, a control surface having a hinged end pivotally coupled to the wing structure; and an actuation mechanism. The actuation mechanism includes a first pivot arm and a second pivot arm coupled to the control surface at the hinged end, and a first drive rod having a forward end and an aft end, the aft end coupled to the first pivot arm. The actuation mechanism also includes a second drive rod having a forward end and an aft end, the aft end coupled to the second pivot arm. The actuation mechanism further includes a first bell crank coupled via a first pivot pin to the wing structure at a first position, the first bell crank having a first end portion coupled to the forward end of the first drive rod and a second end portion, a second bell crank coupled via a second pivot pin to the wing structure at a second position spaced apart from the first position, the second bell crank having a first end portion coupled to the forward end of the second drive rod and a second end portion, and a coupling rod extending between the second end portion of the first bell crank and the second end portion of the second bell crank such that a rotation of the first bell crank is synchronized with a rotation of the second bell crank.

In some aspects, the coupling rod further synchronizes a displacement of the first and second drive rods to inhibit skewing of the control surface when the control surface moves between a stowed position and a deployed position.

In some aspects, the first and second bell cranks and the coupling rod are disposed forward of a spoiler beam of the wing structure.

In some aspects, the first and second drive rods extend through the spoiler beam of the wing structure.

In some aspects, the first bell crank defines a first angle between the first end portion and the second end portion, and the second bell crank defines a second angle between the first end portion and the second end portion such that the first and second bell cranks permit synchronized rotation and translation of the control surface.

In some aspects, the first bell crank defines a first angle between the first end portion and the second end portion, and the second bell crank defines a second angle between the first end portion and the second end portion such that the first and second bell cranks permit synchronized rotation and not translation of the control surface.

In some aspects, the first pivot arm includes a first attachment point adjacent to the control surface and a second attachment point spaced apart from the control surface, and the first drive rod is coupled to the first pivot arm at the first attachment point. The second pivot arm includes a first attachment point adjacent to the control surface and a second attachment point spaced apart from the control surface, and the second drive rod is coupled to the second pivot arm at the first attachment point. Rotation of the first and second bell cranks drives a synchronous rotation of the control surface.

In some aspects, the first pivot arm includes a first attachment point adjacent to the control surface and a second attachment point spaced apart from the control surface, and the first drive rod is coupled to the first pivot arm at the second attachment point. The second pivot arm includes a first attachment point adjacent to the control surface and a second attachment point spaced apart from the control surface, and the second drive rod is coupled to the second pivot arm at the second attachment point. Rotation of the first and second bell cranks drives a synchronous rotation and translation of the control surface.

In some aspects, the vehicle further includes an actuator coupled to an inboard side of the control surface, the actuator configured to control the rotation of the first and second bell cranks.

In another aspect of the present disclosure, a vehicle includes a moveable surface support structure, a moveable surface having a hinged end pivotally coupled to the moveable surface support structure, and a moveable surface actuation mechanism. The moveable surface actuation mechanism includes a first pivot arm and a second pivot arm coupled to the moveable surface at the hinged end, a first drive rod having a forward end and an aft end, the aft end coupled to the first pivot arm, a second drive rod having a forward end and an aft end, the aft end coupled to the second pivot arm, a first bell crank coupled via a first pivot pin to the moveable surface support structure at a first position, the first bell crank having a first end portion coupled to the forward end of the first drive rod and a second end portion, a second bell crank coupled via a second pivot pin to the moveable surface support structure at a second position spaced apart from the first position, the second bell crank having a first end portion coupled to the forward end of the second drive rod and a second end portion, and a coupling rod extending between the second end portion of the first bell crank and the second end portion of the second bell crank such that a rotation of the first bell crank is synchronized with a rotation of the second bell crank.

In some aspects, the coupling rod further synchronizes a displacement of the first and second drive rods to inhibit skewing of the moveable surface when the moveable surface moves between a stowed position and a deployed position.

In some aspects, the first pivot arm includes a first attachment point adjacent to the moveable surface, a second attachment point spaced apart from the moveable surface, and the first drive rod is coupled to the first pivot arm at the first attachment point, and wherein the second pivot arm includes a first attachment point adjacent to the moveable surface, a second attachment point spaced apart from the moveable surface, and the second drive rod is coupled to the second pivot arm at the first attachment point such that the rotation of the first and second bell cranks drives a synchronous rotation of the moveable surface.

In some aspects, the first pivot arm includes a first attachment point adjacent to the moveable surface, a second attachment point spaced apart from the moveable surface, and the first drive rod is coupled to the first pivot arm at the second attachment point, and wherein the second pivot arm includes a first attachment point adjacent to the moveable surface, a second attachment point spaced apart from the moveable surface, and the second drive rod is coupled to the second pivot arm at the second attachment point such that the rotation of the first and second bell cranks drives a synchronous rotation and translation of the moveable surface.

In another aspect of the present disclosure, a wing for a vehicle includes an upper wing surface and a lower wing surface joined by a wing structure, a control surface having a hinged end pivotally coupled to the wing structure, and an actuation mechanism. The actuation mechanism includes a first pivot arm and a second pivot arm coupled to the control surface at the hinged end, a first drive rod having a forward end and an aft end, the aft end coupled to the first pivot arm, a second drive rod having a forward end and an aft end, the aft end coupled to the second pivot arm, a first bell crank coupled via a first pivot pin to the wing structure at a first position, the first bell crank having a first end portion coupled to the forward end of the first drive rod and a second end portion, a second bell crank coupled via a second pivot pin to the wing structure at a second position spaced apart from the first position, the second bell crank having a first end portion coupled to the forward end of the second drive rod and a second end portion, and a coupling rod extending between the second end portion of the first bell crank and the second end portion of the second bell crank such that a rotation of the first bell crank is synchronized with a rotation of the second bell crank to inhibit a skew of the control surface when the control surface moves between a stowed position and a deployed position.

In yet another aspect of the present disclosure, a method for actuation of a moveable surface coupled to a support structure at a hinged end includes providing an actuation mechanism comprising a first pivot arm and a second pivot arm coupled to the moveable surface at the hinged end, a first drive rod having a forward end and an aft end, the aft end coupled to the first pivot arm, a second drive rod having a forward end and an aft end, the aft end coupled to the second pivot arm, a first bell crank coupled via a first pivot pin to the support structure at a first position, the first bell crank having a first end portion coupled to the forward end of the first drive rod and a second end portion, a second bell crank coupled via a second pivot pin to the support structure at a second position spaced apart from the first position, the second bell crank having a first end portion coupled to the forward end of the second drive rod and a second end portion, and a coupling rod extending between the second end portion of the first bell crank and the second end portion of the second bell crank. The method also includes providing an actuator coupled to the actuation mechanism, applying, via the actuator, a force to the actuation mechanism, and inducing rotation of the first and second bell cranks, via the applied force from the actuator, such that the force is translated to the first and second drive rods to inhibit skewing of the moveable surface when the moveable surface moves between a stowed position and a deployed position.

In some aspects, applying the force to the actuation mechanism induces a rotation of the first bell crank that is synchronized with a rotation of the second bell crank.

BRIEF DESCRIPTION OF THE DRAWINGS

The present disclosure will be described in conjunction with the following figures, wherein like numerals denote like elements.

FIG. 1 is a schematic illustration of a side perspective view of a moveable surface and an actuation mechanism in a first position, according to an embodiment.

FIG. 2 is a schematic illustration of a top view of the moveable surface and actuation mechanism of FIG. 1.

FIG. 3 is a schematic illustration of a side perspective view of the moveable surface and actuation mechanism of FIG. 1 in a second position, according to an embodiment.

FIG. 4 is a schematic illustration of a top view of the moveable surface and actuation mechanism of FIG. 3.

Figure 5:
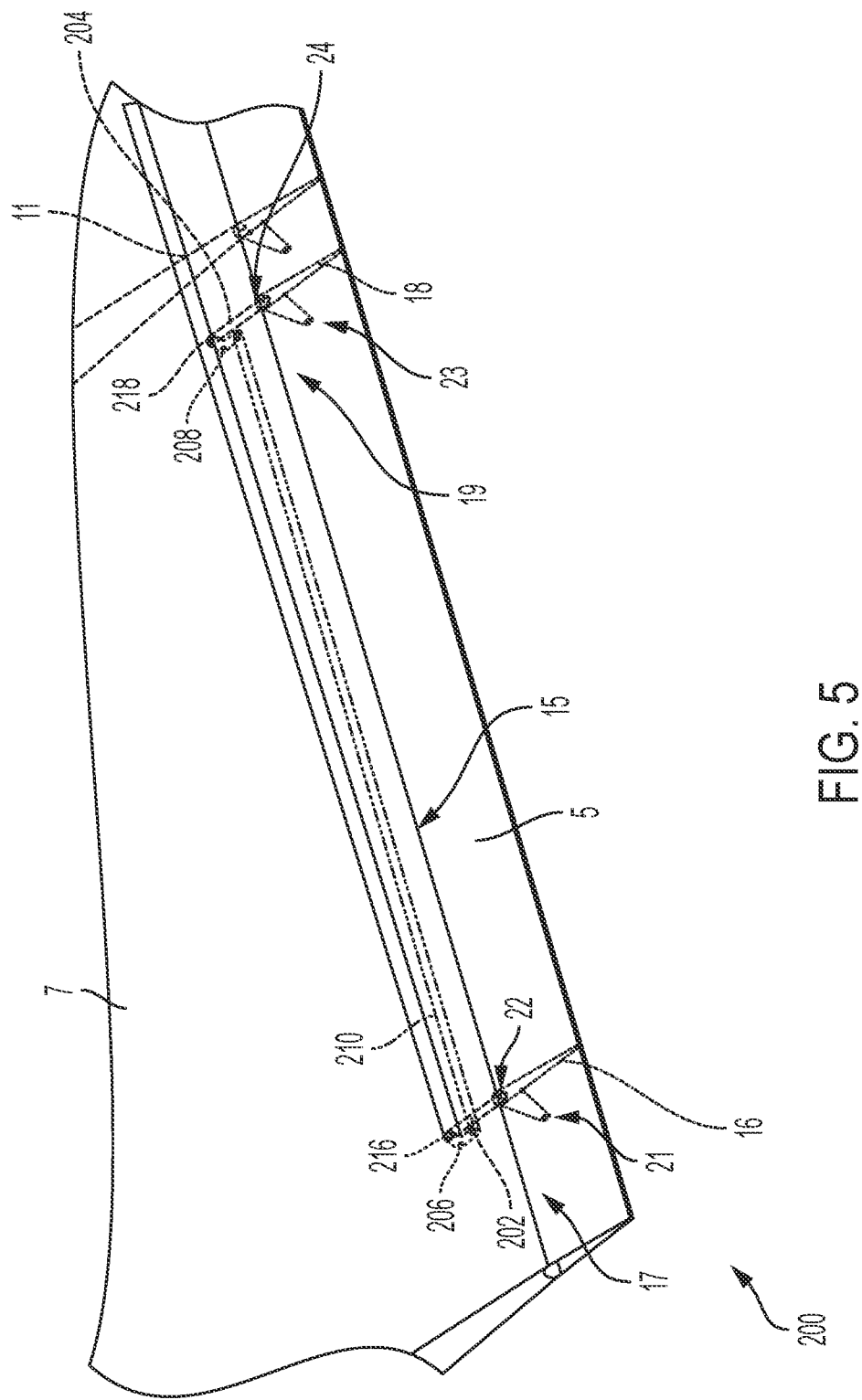
FIG. 5 is a schematic illustration of a top perspective view of a moveable surface and actuation mechanism in a first position, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "fore," "aft" "left" "right," "rear," and "side" describe the orientation and/or location of portions of the components or elements within a consistent but arbitrary frame of reference which is made clear by reference to the text and the associated drawings describing the components or elements under discussion. Moreover, terms such as "first" "second," "third," and so on may be used to describe separate components. Such terminology may include the words specifically mentioned above, derivatives thereof, and words of similar import.

The embodiments discussed herein feature an actuation mechanism configured to rotate a moveable surface of an aircraft, such as, for example and without limitation, a droop panel coupled to a wing, in a way that reduces skew of the moveable surface. The actuation mechanism includes a pair of drive rods coupled to the moveable surface and to twin bell cranks pivotally coupled to an aircraft structure. The bell cranks are connected by a coupling rod to synchronize rotation of the bell cranks.

Referring to the drawings, where like reference numbers refer to like components, an embodiment of an actuation mechanism 100 for a moveable surface of an aircraft is shown in FIGS. 1 and 2 in a first position. In the illustrated embodiment, the actuation mechanism 100 is coupled to a droop panel 5 of an aircraft wing 7. The droop panel 5 is positioned adjacent to a flap 6 of the aircraft wing 7. A wing structure 10 of the aircraft wing 7 includes a beam 11, that is, in some embodiments, a spoiler beam.

The droop panel 5 has a hinged end 15 that is coupled to the wing structure 10. A first pivot arm 16 is positioned on the hinged end 15 at a first position 17 of the droop panel 5 and a second pivot arm (not shown) is positioned on the hinged end 15 at a second position 19 of the droop panel 5 opposite the first position 17. The actuation mechanism 100 includes a first drive rod 102 coupled to the first pivot arm 16 and a second drive rod 104 coupled to the second pivot arm. The first and second drive rods 102, 104 extend through openings in the beam 11.

The first drive rod 102 has a forward end and an aft end. The aft end of the first drive rod 102 is coupled to the first pivot arm 16. Similarly, the second drive rod 104 has a forward end and an aft end. The aft end of the second drive rod 104 is coupled to the second pivot arm.

With continued reference to FIGS. 1 and 2, the actuation mechanism 100 also includes a first bell crank 106 and a second bell crank 108. The first bell crank 106 is coupled to the wing structure 10 via a first pivot pin 116 at a first position. The second bell crank 108 is coupled to the wing structure 10 via a second pivot pin 118 at a second position such that the first and second bell cranks 106, 108 are spaced apart. The first and second pivot pins 116, 118 allow the first and second bell cranks 106, 108 to rotate relative to the wing structure 10 as the moveable surface, in the illustrated embodiment, the droop panel 5, is moved between stowed and rotated positions, as discussed in greater detail herein.

The first bell crank 106 has a first end portion 126 coupled with the forward end of the first drive rod 102 and a second end portion 136. Similarly, the second bell crank 108 has a first end portion 128 coupled with the forward end of the second drive rod 104 and a second end portion 138. The actuation mechanism 100 further includes a coupling rod 110 extending between the second end portion 136 of the first bell crank 106 and the second end portion 138 of the second bell crank 108. The coupling rod 110 couples the first and second bell cranks 106, 108 such that rotation of the first bell crank 106 is synchronized with rotation of the second bell crank 108. The coupling rod 110 further synchronizes a displacement of the first and second drive rods 102, 104 to inhibit skewing of the moveable surface (e.g., droop panel 5) when the moveable surface moves between a first position and a second position. The synchronized rotation of the bell cranks reduces skew of the ends of the moveable surface. Additionally, the actuation mechanism 100, including a coupled actuator 222 or actuators 222, may be placed on an inboard side of the moveable surface or forward of the wing structure such that the actuation mechanism 100 does not cause increased drag.

FIGS. 3 and 4 illustrate the actuation mechanism 100 in a second position in which the moveable surface, in this embodiment, the droop panel 5, is in an extended position. The first and second bell cranks 106, 108 have rotated about the first and second pivot pins 116, 118, respectively, and their rotation is synchronized by the coupling rod 110 extending therebetween. This enables rotation of the droop panel 5 to the position best illustrated in FIG. 3, with the first and second sides 17, 19 of the droop panel 5 rotating synchronously to reduce skew of the droop panel 5.

Figure 6:
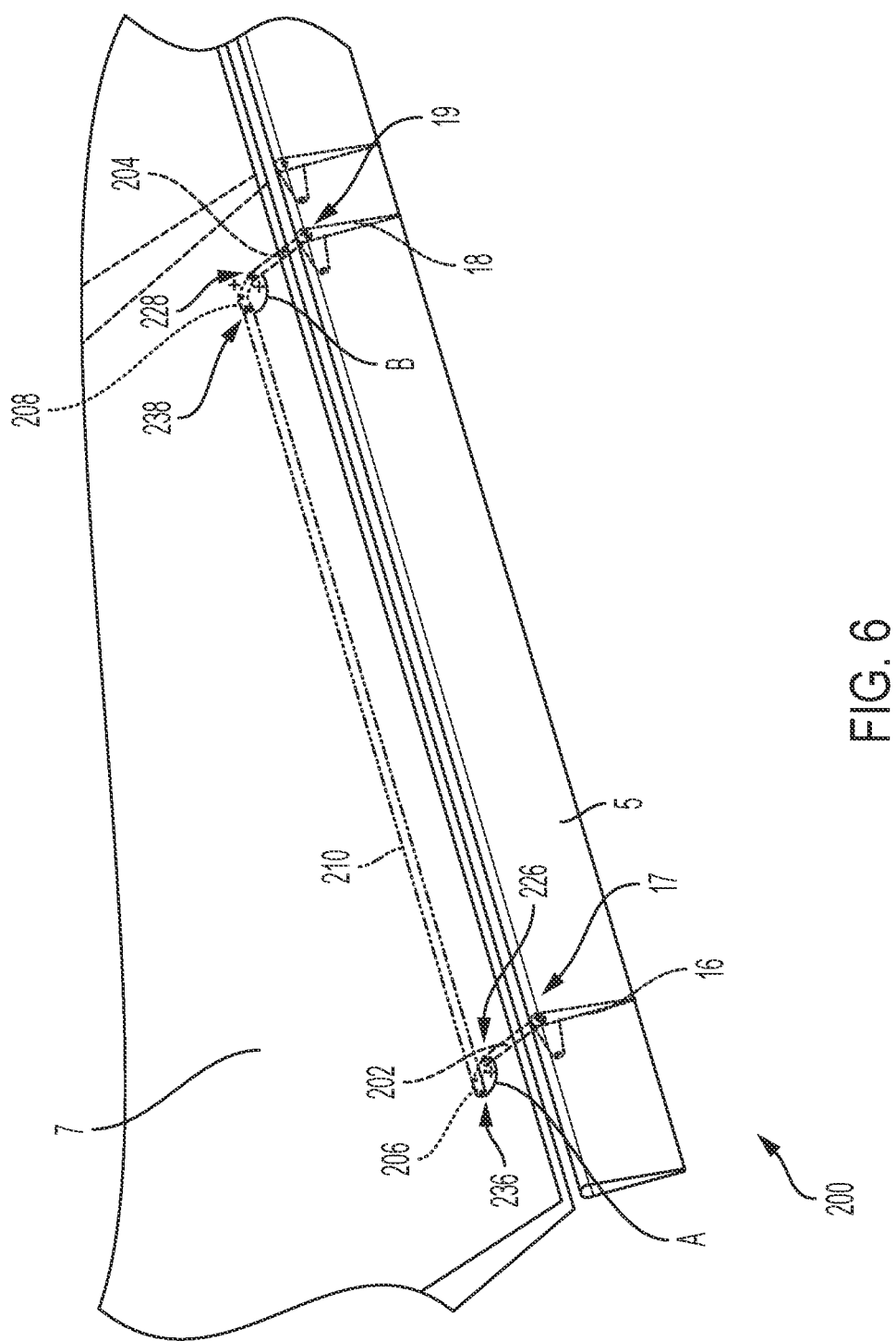
FIG. 6 is a schematic illustration of a top perspective view of the moveable surface and actuation mechanism of FIG. 5 in a second position.
Figure 7:
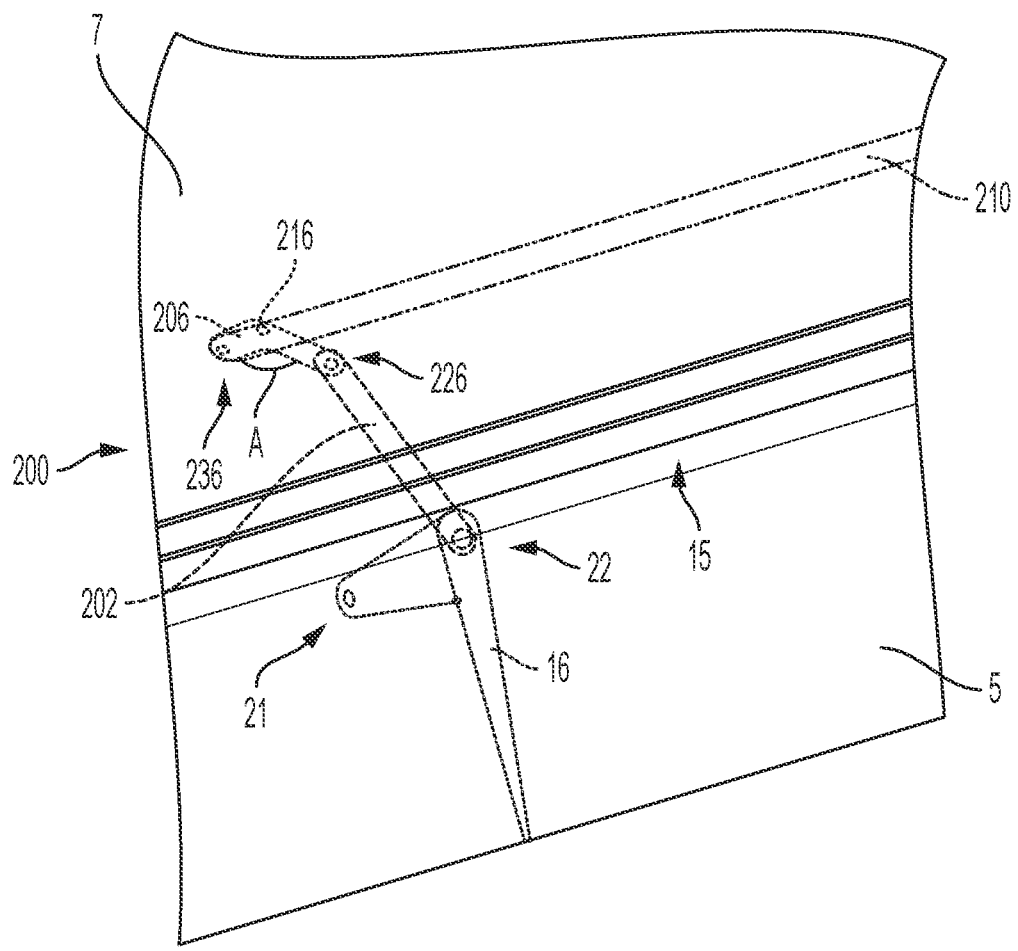
FIG. 7 is a schematic illustration of a top perspective view of a portion of the actuation mechanism of FIG. 6.

FIGS. 5-7 illustrate an actuation mechanism 200 according to another embodiment. In the illustrated embodiment, the moveable surface is a control surface 5 coupled to the trailing edge of the wing 7. In some embodiments, the control surface 5 is coupled to the aft end of a main flap and the control surface 5 is a secondary flap. The control surface 5 has a hinged end 15 that is coupled to the wing structure 10.

A first pivot arm 16 is positioned on the hinged end 15 at a first position 17 on the control surface 5 and a second pivot arm 18 is positioned on the hinged end 15 at a second position 19 on the control surface 5 opposite the first position 17. The second position 19 is spaced apart from the first position 17. In various embodiments, the first position 17 is proximate to an edge of the control surface 5 while the second position 19 is inboard of the first position. The actuation mechanism 200 includes a first drive rod 202 coupled to the first pivot arm 16 and a second drive rod 204 coupled to the second pivot arm 18. While not shown, in various embodiments, the first and second drive rods 202, 204 extend through openings in the wing structure 10, similar to the embodiment shown in FIGS. 1-4.

The first drive rod 202 has a forward end and an aft end. The aft end of the first drive rod 202 is coupled to the first pivot arm 16. The first pivot arm 16 includes a first attachment point 21 and a second attachment point 22 spaced apart from the first attachment point 21. In various embodiments, the first attachment point 21 is adjacent to the control surface 5 and the second attachment point 22 is spaced apart from the control surface 5. The first drive rod 202 is coupled to the first pivot arm 16 at the second attachment point 22. Similarly, the second drive rod 204 has a forward end and an aft end. The aft end of the second drive rod 204 is coupled to the second pivot arm 18. The second pivot arm 18 includes a first attachment point 23, a second attachment point 24 spaced apart from the first attachment point 23, and the second drive rod 204 is coupled to the second pivot arm 18 at the second attachment point 24. In various embodiments, the first attachment point 23 is adjacent to the control surface 5 and the second attachment point 24 is spaced apart from the control surface 5.

With continued reference to FIGS. 5-7, the actuation mechanism 200 also includes a first bell crank 206 and a second bell crank 208. In the illustrated embodiment, the first bell crank 206 is coupled to the wing structure 10 via a first pivot pin 216 at a first position. Similarly, in the illustrated embodiment, the second bell crank 208 is coupled to the wing structure 10 via a second pivot pin 218 at a second position such that the first and second bell cranks 206, 208 are spaced apart along the span of the control surface 5. In various embodiments, the first and second bell cranks 206, 208 are coupled to a wing structure or a flap of the wing 7. The first and second pivot pins 216, 218 allow the first and second bell cranks 206, 208 to rotate relative to the wing structure 10 as the moveable surface, in the illustrated embodiment, the control surface 5, is moved between a first or stowed position and a second or deployed position, as discussed in greater detail herein.

With reference to FIG. 7, the first bell crank 206 has a first end portion 226 coupled with the forward end of the first drive rod 202 and a second end portion 236. Similarly, the second bell crank 208 has a first end portion 228 coupled with the forward end of the second drive rod 204 and a second end portion 238. As shown in FIGS. 6 and 7, the first bell crank 206 includes a first angle A between the first end portion 226 and the second end portion 236 and the second bell crank 208 includes a second angle B between the first end portion 228 and the second end portion 238 such that the first and second bell cranks 206, 208 permit synchronized rotation and translation of the control surface 5.

The actuation mechanism 200 further includes a coupling rod 210 extending between the second end portion 236 of the first bell crank 206 and the second end portion 238 of the second bell crank 208. The coupling rod 210 couples the first and second bell cranks 206, 208 such that rotation of the first bell crank 206 is synchronized with rotation of the second bell crank 208. The synchronized rotation of the bell cranks reduces skew of the ends of the moveable surface. Additionally, the actuation mechanism 200, including a coupled actuator or actuators, may be placed on an inboard side of the moveable surface or control surface 5 or forward of the wing structure such that the actuation mechanism 200 does not cause increased drag.

Rotation of the first and second bell cranks 206, 208 drives a synchronous rotation and translation of the control surface 5. FIG. 5 illustrates the control surface 5 in a first position. FIG. 6 illustrates the control surface 5 in a second position. Between the first and second positions, the control surface 5 rotates and translates relative to the wing 7 via the synchronous rotation of the first and second bell cranks 206, 208 due to the coupling rod 210 extending therebetween. The synchronous rotation of the first and second bell cranks 206, 208 enables rotation and translation of the control surface 5 to the second position illustrated in FIG. 6 with a reduced skew of the control surface 5. As shown in FIGS. 5 and 6, the control surface 5 includes at least one actuation mechanism 200 with the coupling rod 210 extending at least some portion of the span of the control surface 5. In various embodiments, one or more actuation mechanisms 200 are coupled along the span of the control surface 5 to control the rotation and translation of the control surface 5 and reduce skew of the control surface 5.

Figure 8:
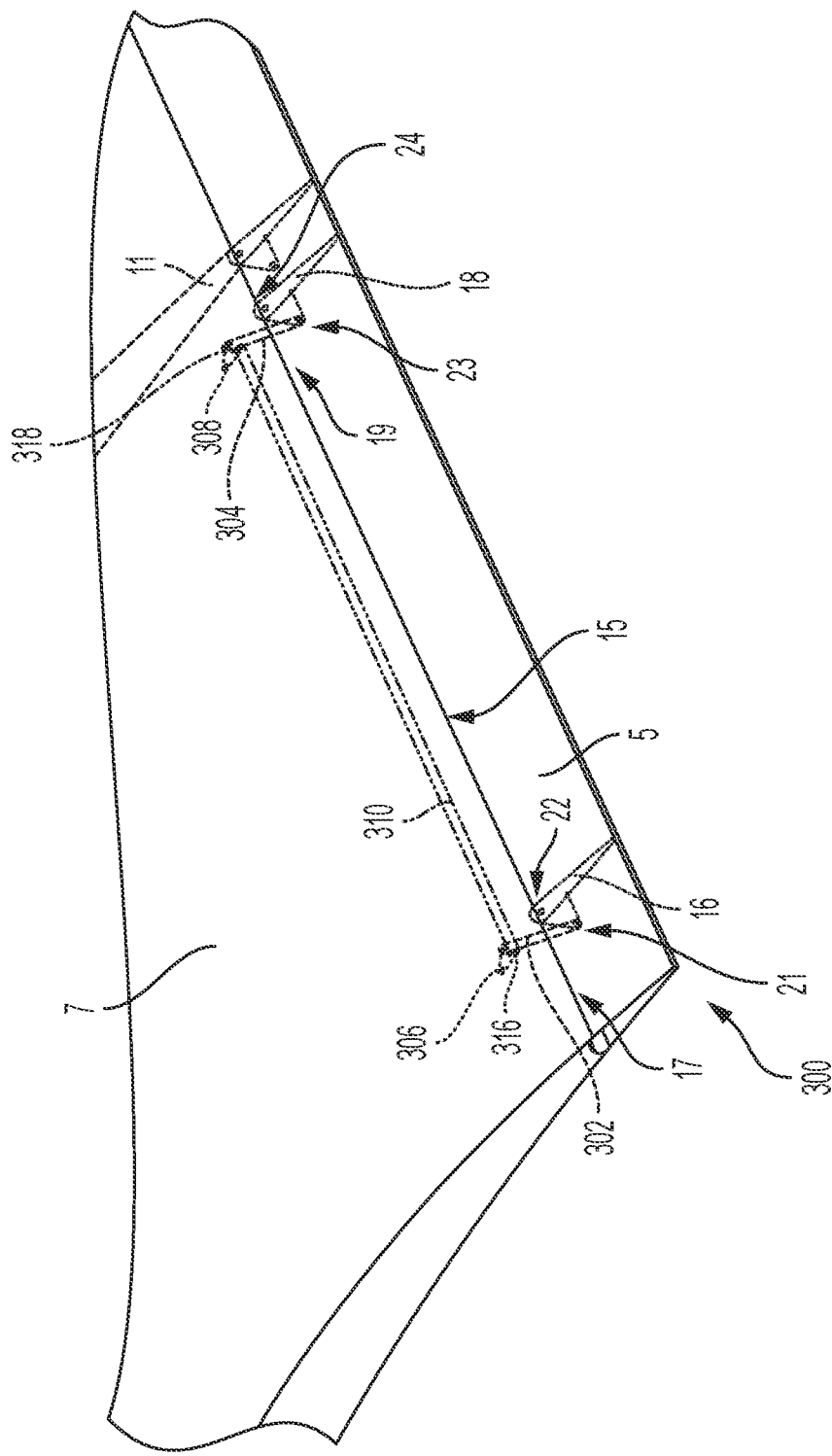
FIG. 8 is a schematic illustration of a top perspective view of a moveable surface and actuation mechanism in a first position, according to another embodiment.
Figure 9:
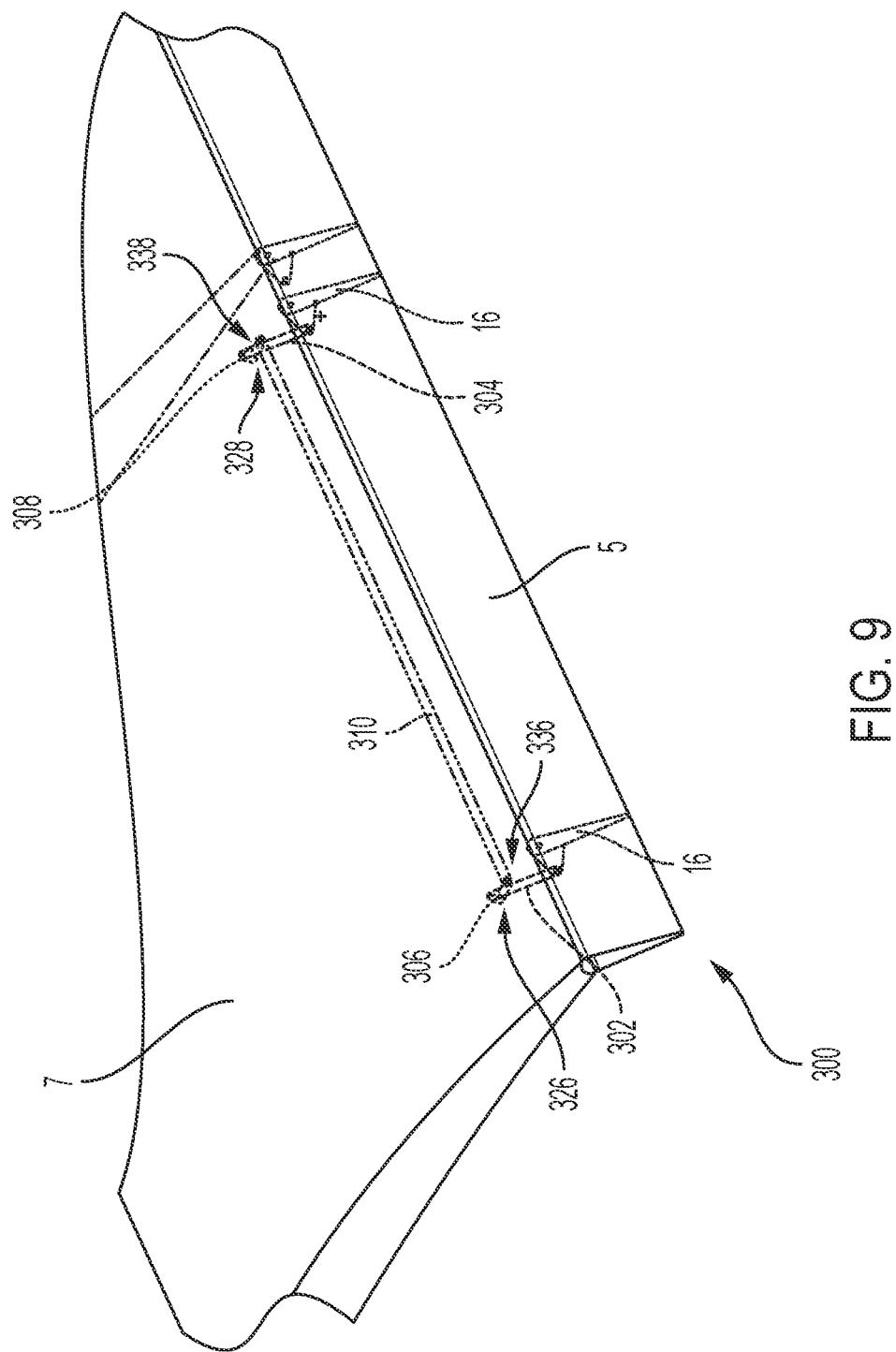
FIG. 9 is a schematic illustration of a top perspective view of the moveable surface and actuation mechanism of FIG. 8 in a second position.
Figure 10:
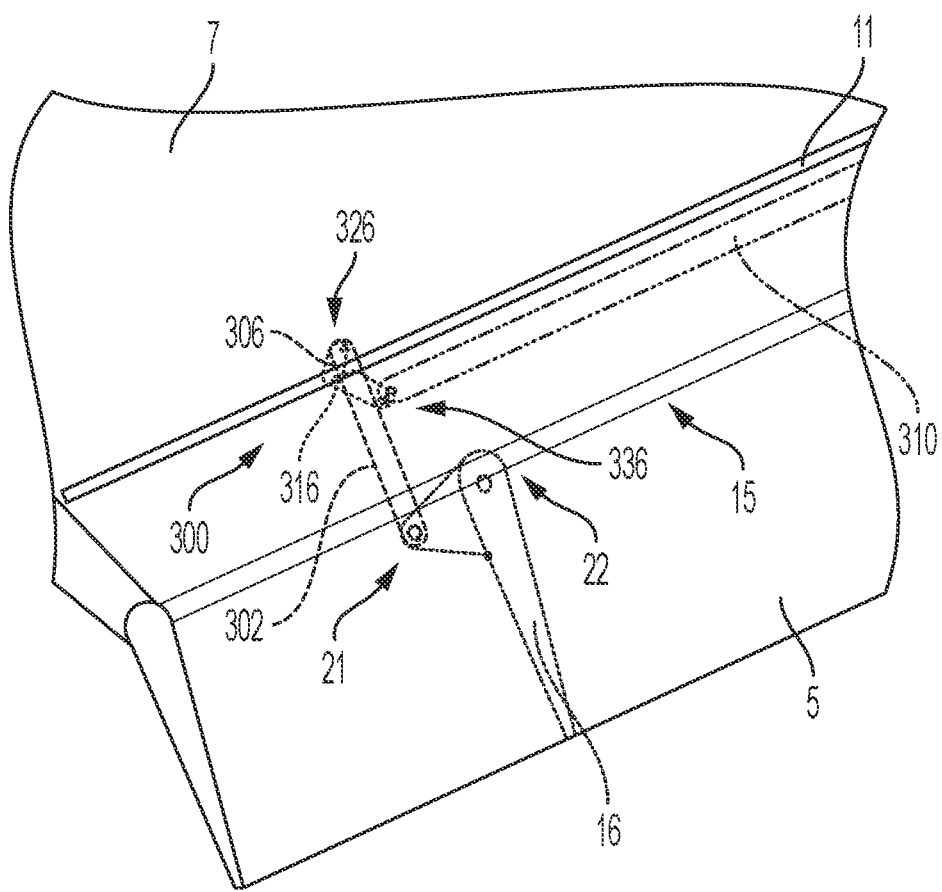
FIG. 10 is a schematic illustration of a top perspective view of a portion of the actuation mechanism of FIG. 9.

FIGS. 8-10 illustrate an actuation mechanism 300 according to another embodiment. In the illustrated embodiment, the moveable surface is a control surface 5 coupled to trailing edge of the wing 7. The control surface 5 has a hinged end 15 that is coupled to the wing structure 10.

A first pivot arm 16 is positioned on the hinged end 15 at a first position 17 on the control surface 5 and a second pivot arm 18 is positioned on the hinged end 15 at a second position 19 on the control surface 5 opposite the first side. The second position 19 is spaced apart from the first position 17. In various embodiments, the first position 17 is proximate to an edge of the control surface 5 while the second position 19 is inboard of the first position 17. The actuation mechanism 300 includes a first drive rod 302 coupled to the first pivot arm 16 and a second drive rod 304 coupled to the second pivot arm 18. While not shown, in various embodiments, the first and second drive rods 302, 304 extend through openings in the wing structure 11, similar to the embodiment shown in FIGS. 1-4.

The first drive rod 302 has a forward end and an aft end. The aft end of the first drive rod 302 is coupled to the first pivot arm 16. The first pivot arm 16 includes a first attachment point 21 and a second attachment point 22 spaced apart from the first attachment point 21. The first drive rod 302 is coupled to the first pivot arm 16 at the first attachment point 21. In various embodiments, the first attachment point 21 is adjacent to the control surface 5 and the second attachment point 22 is spaced apart from the control surface 5. Similarly, the second drive rod 304 has a forward end and an aft end. The aft end of the second drive rod 304 is coupled to the second pivot arm 18. The second pivot arm 18 includes a first attachment point 23, a second attachment point 24 spaced apart from the first attachment point 23, and the second drive rod 304 is coupled to the second pivot arm 18 at the first attachment point 23. In various embodiments, the first attachment point 23 is adjacent to the control surface 5 and the second attachment point 24 is spaced apart from the control surface 5.

With continued reference to FIGS. 8-10, the actuation mechanism 300 also includes a first bell crank 306 and a second bell crank 308. The first bell crank 306 is coupled to the wing structure 10 via a first pivot pin 316 at a first position. The second bell crank 308 is coupled to the wing structure 10 via a second pivot pin 318 at a second position such that the first and second bell cranks 306, 308 are spaced apart along the span of the control surface 5. The first and second pivot pins 316, 318 allow the first and second bell cranks 306, 308 to rotate relative to the wing structure 10 as the moveable surface, in the illustrated embodiment, the control surface 5, is moved between stowed and deployed positions, as discussed in greater detail herein.

With reference to FIG. 9, the first bell crank 306 has a first end portion 326 coupled with the forward end of the first drive rod 302 and a second end portion 336. Similarly, the second bell crank 308 has a first end portion 328 coupled with the forward end of the second drive rod 304 and a second end portion 338. Similar to the embodiment shown in FIGS. 6 and 7, the first bell crank 306 includes a first angle between the first end portion 326 and the second end portion 336 and the second bell crank 308 includes a second angle between the first end portion 328 and the second end portion 338 such that the first and second bell cranks 306, 308 permit synchronized rotation but not translation of the control surface 5.

The actuation mechanism 300 further includes a coupling rod 310 extending between the second end portion 336 of the first bell crank 306 and the second end portion 338 of the second bell crank 308. The coupling rod 310 couples the first and second bell cranks 306, 308 such that rotation of the first bell crank 306 is synchronized with rotation of the second bell crank 308. The synchronized rotation of the bell cranks reduces skew of the ends of the moveable surface. Additionally, the actuation mechanism 300, including a coupled actuator or actuators, may be placed on an inboard side of the moveable surface or control surface 5 or forward of the wing structure such that the actuation mechanism 300 does not cause increased drag.

Rotation of the first and second bell cranks 306, 308 drives a synchronous rotation of the control surface 5. FIG. 8 illustrates the control surface 5 in a first position. FIG. 9 illustrates the control surface 5 in a second position. Between the first and second positions, the control surface 5 rotates relative to the wing 7 via the synchronous rotation of the first and second bell cranks 306, 308 due to the coupling rod 310 extending therebetween. The synchronous rotation of the first and second bell cranks 306, 308 enables rotation and translation of the control surface 5 to the second position illustrated in FIG. 8 with a reduced skew of the control surface 5. As shown in FIGS. 8 and 9, the control surface 5 includes at least one actuation mechanism 300 with the coupling rod 310 extending at least some portion of the span of the control surface 5. In various embodiments, one or more actuation mechanisms 300 are coupled along the span of the control surface 5 to control the rotation of the control surface 5 and reduce skew of the control surface 5.

The twin bell cranks illustrated in the actuation mechanism 100, 200, 300 take the rotation of one end of a moveable surface, such as the droop panel or control surface illustrated, and rotate the opposite end an equal amount. This synchronous rotation reduces the twist of the moveable surface. Twist in control surfaces, such as droop panels, cause sub-optimal gaps between the panel and the wing flap, penalizing performance. Additionally, as an actuator to drive the actuation mechanism 100, 200, 300 may be positioned inboard of the actuation mechanism 100, 200, 300, additional space for integration in the trailing edge cove is enabled. The coupling of the two bell cranks transfers load from an inboard end of the moveable surface of control surface to an outboard end.

The actuation mechanism 100, 200, 300 discussed herein may be used for various moveable surfaces of a vehicle, such as, for example and without limitation, an aft flap, an aileron, an elevator, and a rudder.

In various embodiments, the actuation mechanism 100, 200, 300 enables a spacing distance between the first and second bell cranks of half the span of the moveable surface. In various embodiments, as noted herein, one or more actuation mechanisms 100, 200, 300 may be placed along the span of the moveable surface to reduce twist or skew in the control surface as the control surface is rotated between a first position and a second position.

Figure 11:
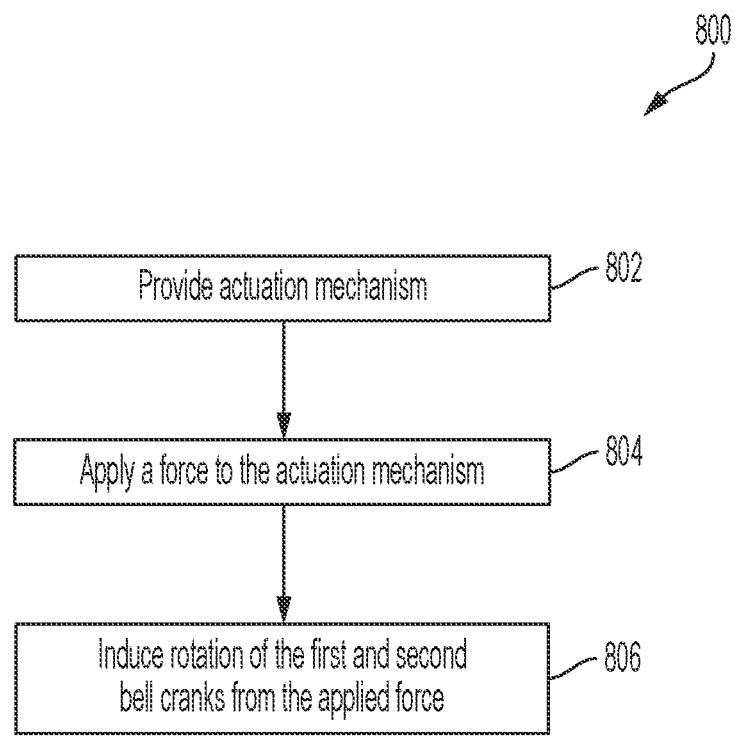
FIG. 11 is a flow chart diagram of a method for controlling the position of a moveable surface, according to an embodiment.

A method 800 for actuation of a moveable surface of a vehicle is illustrated in FIG. 11. First, at 802, an actuation mechanism is provided. The actuation mechanism is any of the actuation mechanisms discussed herein, including the actuation mechanisms 100, 200, or 300. Additionally, an actuator is coupled to the actuation mechanism. Next, at 804, a force is applied via the actuator to the actuation mechanism. Finally, at 806, rotation of the first and second bell cranks of the actuation mechanism is induced from the applied force from the actuator such that that force is translated to the first and second drive rods to inhibit skewing of the moveable surface when the moveable surface moves between a first or stowed position and a second or deployed position. As discussed herein, applying the force to the actuation mechanism induces a rotation of the first bell crank that is synchronized with a rotation of the second bell crank such that both ends of the moveable surface are rotated together to reduce twist in the moveable surface.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes, and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An actuation mechanism, comprising:
    a control surface having a hinged end pivotally coupled to a wing structure including a spoiler beam;
    a first arm and a second arm spaced apart from each other and each coupled to the control surface at the hinged end;
    a first drive rod having a forward end and an aft end, the aft end coupled to the first arm and the forward end extending through an opening in the spoiler beam of the wing structure;
    a second drive rod having a forward end and an aft end, the aft end coupled to the second arm and the forward end extending through an opening in the spoiler beam of the wing structure;
    a first bell crank coupled via a first pivot pin to the wing structure at a first location that is forward of the spoiler beam of the wing structure, wherein a first end portion of the first bell crank is coupled to the forward end of the first drive rod;
    a second bell crank coupled to the wing structure at a second location that is forward of the spoiler beam of the wing structure and spaced apart from the first location, wherein a first end portion of the second bell crank is coupled to the forward end of the second drive rod; and
    a coupling rod extending along a longitudinal axis to a first distal end and a second distal end of the coupling rod and disposed at location that is forward of the spoiler beam of the wing structure, wherein the first distal end of the coupling rod is attached to a second end portion of the first bell crank and the second distal end of the coupling rod is attached to a second end portion of the second bell crank such that rotation of the first bell crank is synchronized with rotation of the second bell crank,
    wherein the first and second bell cranks and the coupling rod are disposed forward of the spoiler beam of the wing structure, such that the actuation mechanism does not cause increased drag.

2. The actuation mechanism of claim 1, wherein the coupling rod further synchronizes a displacement of the first and second drive rods to inhibit skewing of the control surface when the control surface moves between a first position and a second position.

3. The actuation mechanism of claim 1, wherein the first bell crank includes a first angle between the first end portion and the second end portion, and the second bell crank includes a second angle between the first end portion and the second end portion, the first angle and the second angle being substantially the same such that the first and second bell cranks permit synchronized rotation and translation of the control surface.

4. The actuation mechanism of claim 1, wherein:
the first arm includes a first attachment point disposed adjacent to the control surface and a second attachment point spaced apart from the first attachment point and the control surface;
the first drive rod is coupled to the first of arm at the first attachment point;
the second arm includes a first attachment point disposed adjacent to the control surface and a second attachment point spaced apart from the first attachment point and the control surface; and
the second drive rod is coupled to the second arm at the first attachment point such that the rotation of the first and second bell cranks drives a synchronous rotation of the control surface.

5. The actuation mechanism of claim 1, wherein:
the first arm includes a first attachment point disposed adjacent to the control surface and a second attachment point spaced apart from the control surface;
the first drive rod is coupled to the first arm at the second attachment point;
the second arm includes a first attachment point disposed adjacent to the control surface and a second attachment point spaced apart from the control surface; and
the second drive rod is coupled to the second arm at the second attachment point such that the rotation of the first and second bell cranks drives a synchronous rotation and translation of the control surface.

6. The actuation mechanism of claim 1 further comprising an actuator disposed at location that is forward of the spoiler beam of the wing structure, the actuator configured to control the rotation of the first and second bell cranks.

7. A vehicle, comprising:
a wing having a wing structure supporting an upper wing surface and a lower wing surface;
a control surface having a hinged end pivotally coupled to the wing structure including a spoiler beam; and
an actuation mechanism comprising:
a first arm and a second arm spaced apart from each other and each coupled to the control surface at the hinged end;
a first drive rod having a forward end and an aft end, the aft end coupled to the first arm and the forward end extending through an opening in the spoiler beam of the wing structure;
a second drive rod having a forward end and an aft end, the aft end coupled to the second arm and the forward end extending through an opening in the spoiler beam of the wing structure;
a first bell crank coupled via a first pivot pin to the wing structure at a first location that is forward of the spoiler beam of the wing structure, wherein a first end portion of the first bell crank is coupled to the forward end of the first drive rod;
a second bell crank coupled via a second pivot pin to the wing structure at a second location that is forward of the spoiler beam of the wing structure spaced apart from the first location, wherein a first end portion of the second bell crank is coupled to the forward end of the second drive rod; and
a coupling rod extending along a longitudinal axis to a first distal end and a second distal end of the coupling rod and disposed at location that is forward of the spoiler beam of the wing structure, wherein a first pivot axis of the first bell crank and a second pivot axis of the second bell crank each extend substantially parallel to the longitudinal axis, wherein the first distal end of the coupling rod is attached to a second end portion of the first bell crank and the second distal end of the coupling rod is attached to a second end portion of the second bell crank such that rotation of the first bell crank is synchronized with rotation of the second bell crank,
wherein the first and second bell cranks and the coupling rod are disposed forward of the spoiler beam of the wing structure, such that the actuation mechanism does not cause increased drag.

8. The vehicle of claim 7, wherein the coupling rod further synchronizes a displacement of the first and second drive rods to inhibit skewing of the control surface when the control surface moves between a stowed position and a deployed position.

9. The vehicle of claim 7, wherein the first bell crank defines a first angle between the first end portion and the second end portion, and the second bell crank defines a second angle between the first end portion and the second end portion, the first angle and the second angle being substantially the same such that the first and second bell cranks permit synchronized rotation and translation of the control surface.

10. The vehicle of claim 7, wherein:
the first arm includes a first attachment point disposed adjacent to the control surface and a second attachment point spaced apart from the first attachment point and the control surface;
the first drive rod is coupled to the first arm at the first attachment point;
the second arm includes a first attachment point disposed adjacent to the control surface and a second attachment point spaced apart from the first attachment point and the control surface; and
the second drive rod is coupled to the second arm at the first attachment point such that the rotation of the first and second bell cranks drives a synchronous rotation of the control surface.

11. The vehicle of claim 7, wherein:
the first arm includes a first attachment point disposed adjacent to the control surface and a second attachment point spaced apart from the first attachment point and the control surface;
the first drive rod is coupled to the first arm at the second attachment point;
the second arm includes a first attachment point disposed adjacent to the control surface and a second attachment point spaced apart from the first attachment point and the control surface; and
the second drive rod is coupled to the second arm at the second attachment point such that the rotation of the first and second bell cranks drives a synchronous rotation and translation of the control surface.

12. The vehicle of claim 7 further comprising an actuator disposed at location that is forward of the spoiler beam of the wing structure, the actuator configured to control the rotation of the first and second bell cranks.

13. A method for actuation of a moveable surface coupled to a wing structure at a hinged end, comprising:
providing an actuation mechanism comprising a first arm and a second arm spaced apart from each other and each coupled to the moveable surface at the hinged end, a first drive rod having a forward end and an aft end, the aft end coupled to the first arm and the forward end extending through an opening in a spoiler beam of the wing structure, a second drive rod having a forward end and an aft end, the aft end coupled to the second arm and the forward end extending through an opening in the spoiler beam of the wing structure, a first bell crank coupled via a first pivot pin-to the wing structure at a first location that is forward of the spoiler beam of the wing structure, wherein a first end portion of the first bell crank is coupled to the forward end of the first drive rod, a second bell crank coupled via a second pivot pin to the wing structure at a second location that is forward of the spoiler beam of the wing structure spaced apart from the first location, wherein a first end portion of the second bell crank is coupled to the forward end of the second drive rod, and a coupling rod extending along a longitudinal axis to a first distal end and a second distal end of the coupling rod and disposed at location that is forward of the spoiler beam of the wing structure, wherein the first distal end of the coupling rod is attached to a second end portion of the first bell crank and the second distal end of the coupling rod is attached to a second end portion of the second bell crank, wherein the first and second bell cranks and the coupling rod are disposed forward of the spoiler beam of the wing structure, such that the actuation mechanism does not cause increased drag;

providing an actuator coupled to the actuation mechanism;

applying, via the actuator, a force to the actuation mechanism; and inducing rotation of the first and second bell cranks, via the applied force from the actuator, such that the force is translated to the first and second drive rods to inhibit skewing of the moveable surface when the moveable surface moves between a stowed position and a deployed position.

14. The method of claim 13, wherein applying the force to the actuation mechanism induces rotation of the first bell crank that is synchronized with rotation of the second bell crank.

* * * * *

UNITED STATES PATENT AND TRADEMARK OFFICE
CERTIFICATE OF CORRECTION

| | | |
|---|---|---|
| PATENT NO. | : 11,932,377 B2 | Page 1 of 1 |
| APPLICATION NO. | : 17/830400 | |
| DATED | : March 19, 2024 | |
| INVENTOR(S) | : Noah W. Gibson and Kevin Tsai | |

It is certified that error appears in the above-identified patent and that said Letters Patent is hereby corrected as shown below:

In the Claims

Claim 4, Column 13, Line 6: "the first of arm" should read --the first arm--

Signed and Sealed this
Third Day of December, 2024

*Katherine Kelly Vidal*

Katherine Kelly Vidal
*Director of the United States Patent and Trademark Office*